(No Model.)
M. GOTTSHALL.
COMBINED HARROW AND ROLLER.
No. 559,975. Patented May 12, 1896.
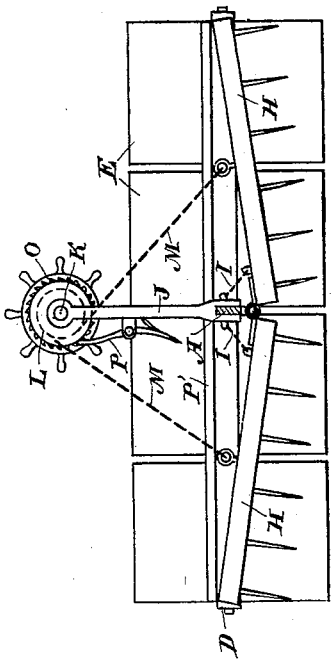
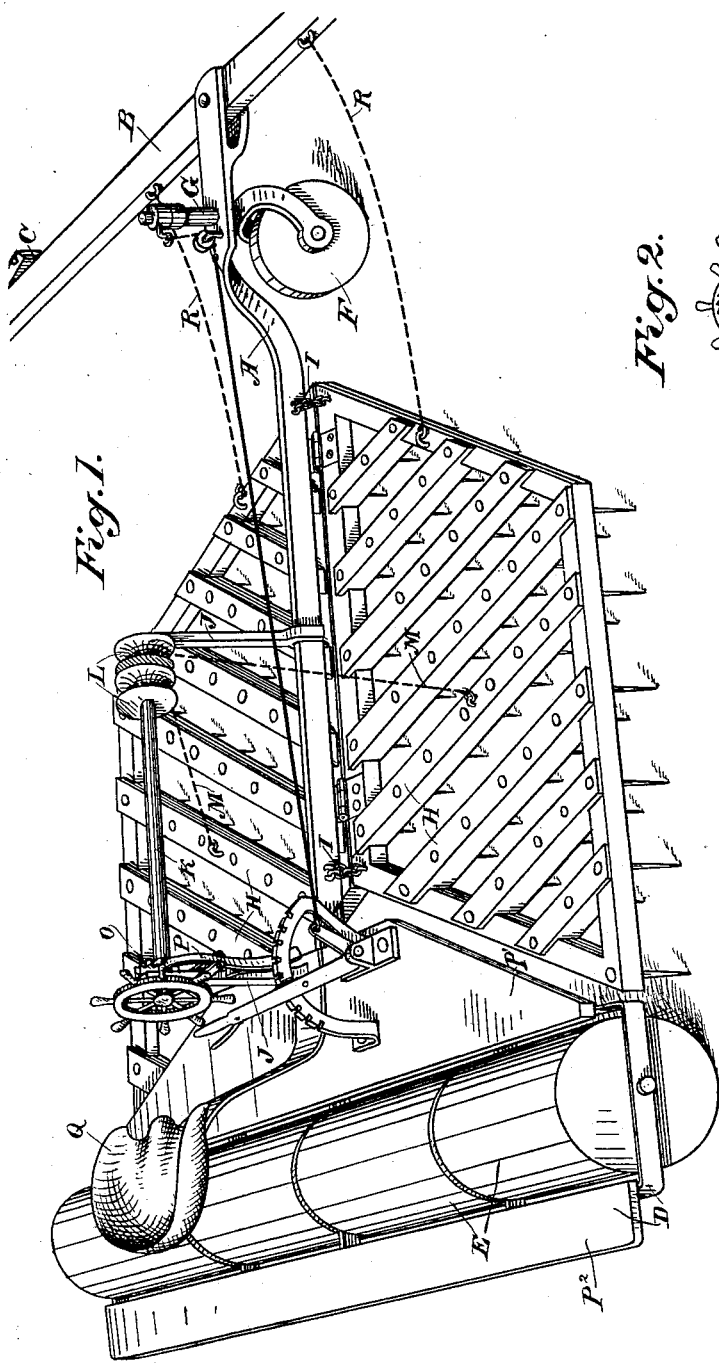
Witnesses,
Inventor,
Martin Gottshall
By Dewey & Co,
Attys

UNITED STATES PATENT OFFICE.

MARTIN GOTTSHALL, OF OAKLAND, CALIFORNIA, ASSIGNOR OF TWO-THIRDS TO LEOPOLD KIEFER AND ANDREW KRUECKEL, OF SAME PLACE.

COMBINED HARROW AND ROLLER.

SPECIFICATION forming part of Letters Patent No. 559,975, dated May 12, 1896.

Application filed January 14, 1896. Serial No. 575,522. (No model.)

*To all whom it may concern:*

Be it known that I, MARTIN GOTTSHALL, a citizen of the United States, residing at Oakland, county of Alameda, State of California, have invented an Improvement in a Combined Harrow and Roller; and I hereby declare the following to be a full, clear, and exact description of the same.

My invention relates to an improved apparatus for cultivating the soil either independently or in connection with a seeding apparatus.

It consists, essentially, of a central bar or frame having an attachment for the team at the front end, a roller or rollers transversely journaled at the rear, and a pair of harrows having their adjacent edges suspended from the intermediate portion of the bar, with mechanism by which the harrows may be raised or tilted or dropped at will.

It consists also in details of construction, which will be more fully explained by reference to the accompanying drawings, in which—

Figure 1 is a view of my improved apparatus. Fig. 2 is an end view.

A is a bar or frame, which may be made of wood, steel, or any suitable material. At the front it is provided with a swiveled bolt connection for the draft-bar B, and to this are attached the single or double trees C, by which the team is connected so as to draw the machine. The rearward portion of the bar has fixed upon it frames D, in which are journaled rollers E. These rollers may be divided into suitable lengths, so that while extending over the full width of the ground to be cultivated they may turn independently upon their axles or shafts, so that when the machine is to be turned about the rollers near one end may revolve in one direction, while those at the opposite end will revolve in the opposite direction as the machine pivots in turning. The rear end of the frame is thus supported upon the rollers, which may be of any suitable diameter.

I have found that a diameter of sixteen inches is very satisfactory in working, but I do not confine myself to this particular size.

The front portion of the bar is supported upon a caster-wheel F, the shaft of which extends vertically upward through a guiding-sleeve G, in which it is freely turnable, so as to allow the wheel to adjust itself to any movements of the machine when turning from side to side. This vertical shaft is also adjustable in the socket, and may be raised or lowered so as to allow the frame to stand farther from or nearer to the ground, as may be desired. The intermediate portion of this bar or frame is here shown as extending in the line of travel of the machine, and somewhat lower than the front portion to which the draft-bar is connected. To this intermediate portion of the frame and at a sufficient distance in front of the rollers, I suspend the inner edges of the harrows H. These harrows are here shown in the form of parallelograms of a rhomboidal shape, and are hinged together along their meeting edges and just beneath the bar A. The front and rear ends of these meeting edges of the harrows are suspended from the bar by short flexible chains or links I, which allow the teeth of the harrows to rest upon and puncture the ground when the harrows are lowered and the machine in working condition.

The front end of the harrows may be raised or depressed, as may be desired, by raising or depressing the front end of the bar upon the shaft of the caster-wheel, as previously described.

Upon the bar A and the rear portion of the frame which carries the rollers are fixed standards J. In these standards a horizontal shaft K is journaled to rotate, and upon its rear end, so as to be within reach of the driver, is a crank, hand-wheel, or other convenient operating mechanism by which the shaft can be turned.

Upon the shaft, at a point approximately opposite the center of the harrows, are fixed the drums L, having secured to them chains M. The opposite ends of these chains extend down to the harrows and are connected with them at some suitable point, so that when the shaft is rotated and the chains wound upon the drums the outer edges of the harrows will be lifted, tilting about their central hinges. When thus lifted, the teeth will be raised out of the ground and any trash which may have accumulated, so as to clog the harrow, can be dropped or cleared away in this manner, after which the harrows can be again dropped into position for work.

If it is desired to raise the harrows and keep them permanently out of the ground when turning, or while traveling from one place to another or over ground which it is not desirable to have the harrow-teeth touch, the winding-shaft may be prevented from rotating by means of a ratchet-wheel O, fixed upon it, and a pawl P, pivoted to the standard and adapted to engage the teeth of the ratchet-wheel. This pawl is actuated by a spring, as shown, and for convenience is extended down to a point near the foot-board P', upon which the standard is fixed.

The second foot-board P² extends across the machine at the rear of the rollers and upon one of these two foot-boards is the standard which supports the seat Q for the driver. This is within easy reach of the hand-wheel or crank upon the rear end of the shaft, so that the driver can raise the harrows at will, and if they are held up by the pawl it is only necessary for him to press upon the lower end with his foot and disengage it, so as to allow the harrows to again drop into position to enter the ground.

The front ends of the harrows are connected with the draft-bar by chains R.

The operation will then be as follows: The machine having reached the place where it is to work, the harrows are dropped, so as to rest upon the ground, and the front end of the machine is adjusted up or down upon the vertical shaft of the caster-wheel to give the harrows the proper angle of draft. When the harrows are thus drawn over the ground, they will act in the usual manner to pulverize and break up the soil and clods, and the rollers following behind will crush any large unbroken clods and will roll the surface down smoothly and even.

It will be manifest that the machine can be used either in conjunction with a seeder or without.

When the end of the field is reached and it is necessary to turn around, the harrows may be raised if the turning takes place outside of the ground to be harrowed, but they may be left in the ground if the turning takes place on the ground which is being harrowed. As soon as the team is turned tension is brought upon the outer of the chains which connect the harrow with the draft-bar, and the caster-wheel turning to conform to the new motion of the machine the team will turn it around, the rollers at the rear turning in opposite directions to suit the pivot-point upon which the harrow is turning. It can thus be turned in a very short space and without leaving any uncultivated ground.

Having thus described my invention, what I claim as new, and desire to secure by Letters Patent, is—

1. A central longitudinal bar, a swivel-wheel upon which the front end is supported, crushing wheels or rollers traversing the rear of the harrows upon which the rear end is supported, a pair of harrows having their adjacent edges hinged and extending beneath the longitudinal bar and suspended therefrom, and means for attaching the beam to the front end of the bar.

2. A longitudinal draft-bar having means for attaching a team to its front end, a caster-wheel by which the front end of said bar is adjustably supported, a frame fixed to the rear end of said bar with crushing rollers or wheels journaled therein, a pair of harrows having their adjacent edges hinged together and suspended from the longitudinal bar in front of the rollers, a rotary shaft journaled in line above the longitudinal bar having winding-drums fixed upon it, and chains extending from said winding-drums to the harrows whereby the outer edges of the latter may be tilted up about their central hinges.

3. A longitudinal bar having its front end supported upon a caster-wheel, its rear end depressed and supported upon crushing-rollers journaled in a frame transversely to the bar, a pair of harrows having their adjacent edges hinged together beneath the bar, flexible links or chains by which the meeting edges of the harrows are suspended from the bar so that they may be raised or depressed with relation thereto, a winding-shaft journaled in line above the bar having winding-drums thereon, chains fixed to the drums and extending outwardly and connecting with the harrows so that by winding the chains upon the drums the harrows may be lifted and tilted about their central hinges, a ratchet-wheel upon the shaft and a spring-actuated pawl, whereby the harrows may be held in the elevated position.

4. A longitudinal bar having a frame fixed to its rear end, crushing-rollers journaled in said frame transversely to the bar and comprising independently-turnable sections, a caster-wheel by which the front end of the bar is supported, the vertical stem or shaft of said caster-wheel passing through a sleeve upon the bar or frame and being adjustable so that the frame may be raised or lowered upon the wheel, a pair of harrows having their meeting edges hinged together, chains by which the front and rear ends of said meeting edges are suspended from the bar intermediate the caster wheel and rollers at the front and rear, a winding-shaft with drums and chains extending therefrom to the harrows whereby the latter may be lifted and tilted, a draw-bar and attachments for the team connected with the front of the longitudinal bar, and chains connecting the draw-bar with the front ends of each of the harrows.

In witness whereof I have hereunto set my hand.

MARTIN GOTTSHALL.

Witnesses:
JESSIE C. BRODIE,
S. H. NOURSE.